Figure 1:
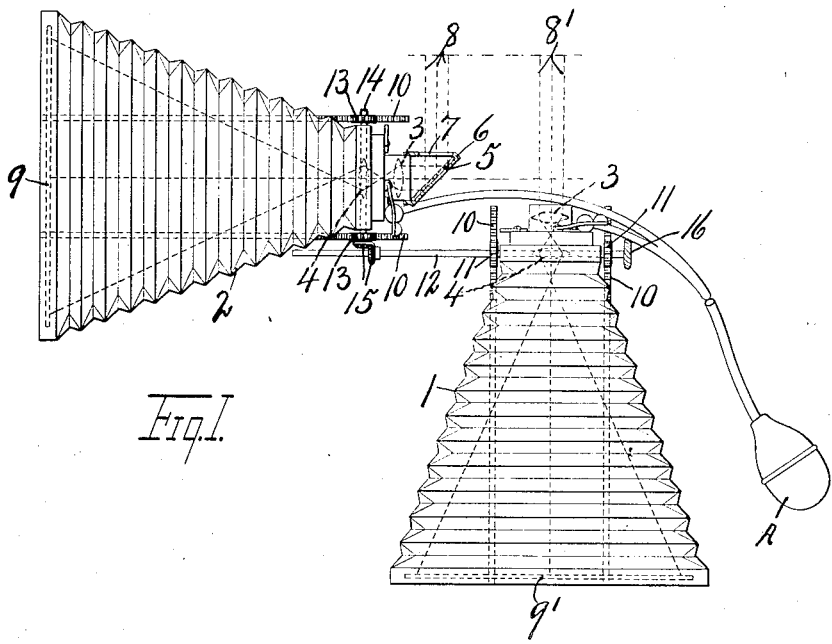

No. 852,476. PATENTED MAY 7, 1907.
W. VERBECK.
PHOTOGRAPHIC APPARATUS.
APPLICATION FILED MAY 3, 1904.

2 SHEETS—SHEET 1.

WITNESSES,
B. E. Robinson.
J. E. Arthur.

INVENTOR,
William Verbeck.
BY,
Howard P. Denison
ATTORNEY.

No. 852,476. PATENTED MAY 7, 1907.
W. VERBECK.
PHOTOGRAPHIC APPARATUS.
APPLICATION FILED MAY 3, 1904.
2 SHEETS—SHEET 2.
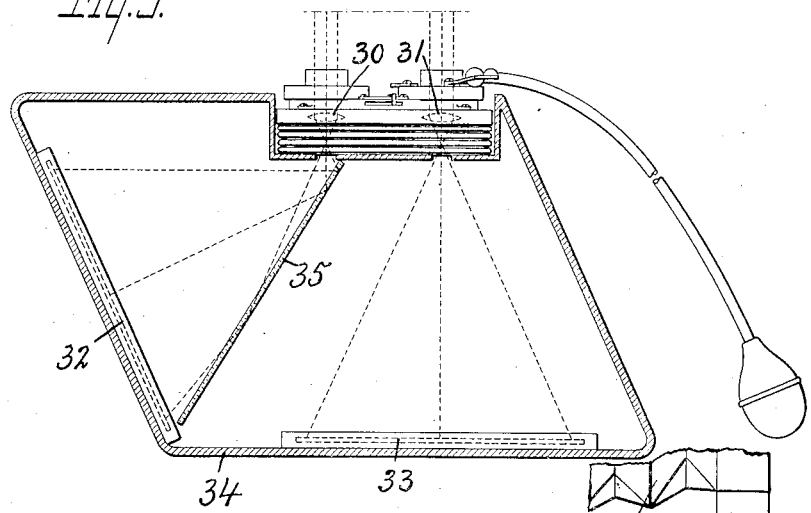
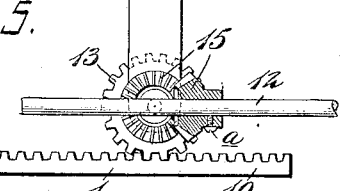
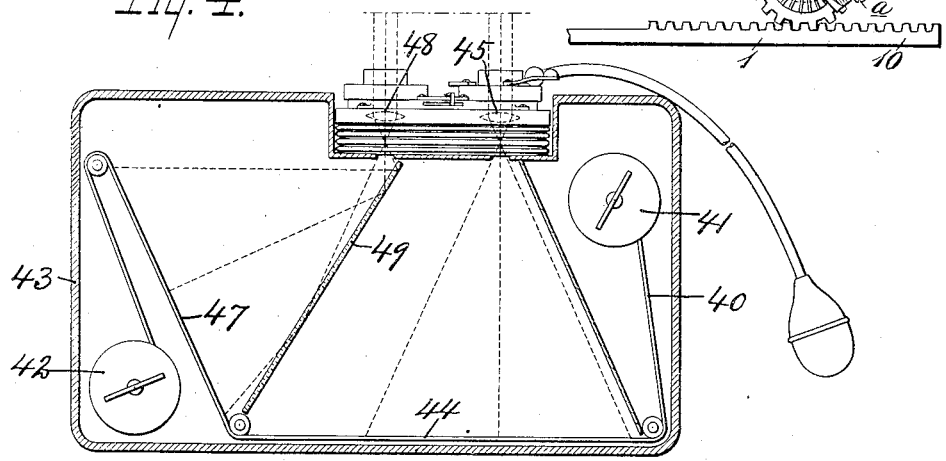
WITNESSES,
B. E. Robinson,
F. E. Arthur,
INVENTOR,
William Verbeck
BY,
Howard P. Denison
ATTORNEY.

UNITED STATES PATENT OFFICE.

WILLIAM VERBECK, OF MANLIUS, NEW YORK.

PHOTOGRAPHIC APPARATUS.

No. 852,476.      Specification of Letters Patent.      Patented May 7, 1907.

Application filed May 3, 1904. Serial No. 206,106.

*To all whom it may concern:*

Be it known that I, WILLIAM VERBECK, of Manlius, in the county of Onondaga, in the State of New York, have invented new and useful Improvements in Photographic Apparatus, of which the following, taken in connection with the accompanying drawings, is a full, clear, and exact description.

This invention relates to improvements in photographic apparatus and refers more particularly to a binocular camera in which the two lenses are focalized on the same object from points spaced apart a distance substantially equal to the separation of the normal lines of vision of the two eyes so as to produce two similar pictures of the same object, which when superimposed one upon the other, gives a stereoscopic effect to the picture.

I am aware that binocular cameras have been employed for producing two similar pictures of the same object in a single exposure and for the same purpose as above described, but these pictures are taken in the same order upon the sensitized surfaces of the camera, that is—corresponding sides of the picture are similar or alike and when the prints are made from the negatives and placed in a stereoscope it is necessary to arrange them in the same order.

My object is to produce a binocular camera in which two reverse pictures may be taken in a single exposure so that reverse prints similar to that set forth in the drawings of my pending application No. 201,051, filed April 1st., 1904, may be made directly from the negatives and placed in the same reverse order at opposite sides of one end of the mirror in the stereoscopic apparatus shown in my pending application above referred to whereby the reflected picture is visually reversed upon the other picture.

Another object is to provide means whereby the distance between the lenses and the photographic plates may be simultaneously varied or adjusted to enlarge or diminish the size of the pictures and still maintain the equality in the comparative size of each to the other. These reverse pictures may be taken simultaneously by several forms of apparatus, and in the drawings—

Figure 2:
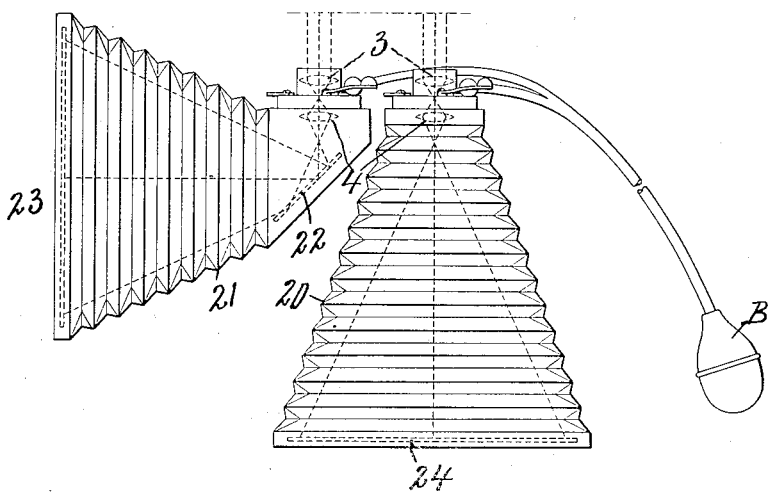

Figure 1 shows one form of binocular camera for this purpose in which two single cameras are yoked together and are provided with means for effecting the adjustment of the photographic plates toward and from their lenses, one of the cameras being provided with a prism or mirror in front of its lens whereby the rays of light from the object are reversed upon its sensitized plate, each of the individual cameras being equipped with a pair of lenses in this instance. Fig. 2 is a view similar to Fig. 1, in which a mirror is interposed between the sensitized plate and lenses of one of the cameras for producing a reverse picture upon the sensitized plate. Fig. 3 is a sectional view of a modified form of binocular camera in which both sensitized plates and their lenses are inclosed in the same case with a mirror interposed between the lens and plate at one side and those at the other side to reverse one of the pictures. Fig. 4 is a sectional view of a further modified form of binocular camera in which a roll of sensitized film is used to receive the photographic pictures, otherwise this camera is similar to that in Fig. 3. Fig. 5 is a detail sectional view of the pinion and a portion of the spindle upon which it is slidable.

The photographic apparatus seen in Fig. 1 consists of two bellows cameras 1— and —2— which are disposed at substantially right angles to each other so that the optical axes of their lenses and also their sensitized plates are each disposed at right angles to the other. These cameras —1— and —2— are each provided with a pair of converging lenses, shown in dotted lines at —3— and —4— which are mounted in their respective heads or the front ends of the cameras in the usual manner, and it is therefore, believed to be unnecessary to further illustrate or describe these lenses or the manner of mounting the same, as the number of lenses or the method of mounting them forms no part of my present invention, except in so far as they are used to concentrate the rays of light upon the sensitized plates in the rear of the cameras. The camera —1— does not differ materially from any well known bellows camera, but the camera —2— is provided with a reflector —5— which in this instance—is located in front of the front lens —3— in a plane intersecting the focal axis of said lens and at an angle of substantially 45 degrees. This mirror is shown as mounted on a suitable support —6— having an opening —7— through which a pencil —8— of light from the object may pass to the reflector —5— from which the rays of light are deflected through the lenses —3— and —4— and onto the photographic plate —9—, shown by dotted lines in the rear of the camera —2—. A similar pencil of light 8'— passes directly through the lenses —3— and —4— of the camera —1— onto a sensitized plate 9'. These cameras are arranged relative to each other so that the axes of the pencils —8— and 8'— are spaced apart a distance substantially equal to the lines of vision of the two eyes, or in the neighborhood of two and one-half to three inches, and at the same time the distances from the object to the lenses —3— measured on the axes of the pencils of light are substantially equal in order to produce the same effect on each photographic plate —9— and 9'—. These cameras —1— and —2—, as before stated, are of bellows type, and are, therefore, expansible or adjustable to vary the distance between the sensitized plate and lens so that the plate may be properly focused, and in using these two cameras as a binocular camera, it is important that the adjustment of both cameras be simultaneous and equal. In order to effect this equal and simultaneous adjustment, I provide each plate holder with a pair of forwardly projecting toothed racks —10—, those of one pair of the camera —1— meshing with the pinions —11— on the rotary spindle —12— while the racks —10— of the other camera —2— mesh with suitable pinions —13— on a spindle 14— which is disposed at substantially right angles to the shaft or spindle —12—, and these two spindles are provided with intermeshing gears 15— so that when one of the spindles is rotated similar motion is transmitted to the other spindle, and therefore, the plate holders —9— and 9'— may be moved back and forth simultaneously a uniform distance the pinion 15 being normally secured to its spindle 12 by a set-screw —a—. One of the spindles, as 12—, is provided with a handpiece 16— by which said spindle is rotated, and its pinion —15— is slidable thereon after loosening its set screw —a— to permit one of the cameras to be moved bodily toward and away from the other camera when it is desired to change the space between the axes of the pencils of light —8— and 8'— for the purpose of obtaining a picture in magnified relief. It will also be observed that I have described the reflector —5— as a mirror, but a prism may in some instances be preferred to the mirror, and in fact I contemplate using a prism in front of the lens of the camera —2— for the purpose of reflecting the light so as to produce a reverse picture on the sensitized plate —9—.

In Fig. 2 of the drawings, I have shown a binocular camera consisting of two single cameras 20 and 21— having the focal axes of their lenses parallel, but their sensitized plates are disposed at substantially right angles to each other, and in this instance, I employ a mirror —22— which is located in the front part of the camera —21— at an angle at substantially 45 degrees with and intersecting the focal axis of the lens. This mirror is placed between the lens and photographic plate, as —23— of the camera 21— in such position as to reflect the rays of light (after they have passed through the lenses) upon the sensitized plate —23—, but in a reverse order from the picture which is taken upon the plate, as 24— of the camera —20—. The optical axes of the lenses in this binocular camera are spaced apart the same distance as those seen in Fig. 1, and in both of these apparatus each camera is provided with shutters both of which are operated from the same source, as for instance—through the medium of the bulbs —A— and —B—. These shutters, however, and their operating mechanisms form no part of my present invention, and therefore, it is unnecessary to further illustrate or describe the same.

The binocular camera seen in Fig. 3 comprises two lenses 30— and 31— and sensitized plates —32— and —33—, which latter are mounted in a suitable casing —34—, and in this case is also mounted a mirror —35—. In this camera the focal axes of the lenses are also parallel and the plate —33— is arranged at substantially right angles to the focal axis of the lens —31—, but the plate —32— is disposed at an acute angle with the axis of the lens —30— while the mirror —35— is also disposed at an angle with and intersects the focal axis of the lens —30— for reflecting the rays of light passing through this lens onto the plate —32— in such manner as to produce a picture reverse from that taken upon the plate —33—. The exact angle or angles of the mirror —35— and plate —32— with reference to the focal axis of the lens —30— is immaterial, the only requirement being that the mirror should be of sufficient area and disposed in such a position as to reflect the rays from the object in the reverse order upon the sensitized plate —32—.

The binocular camera seen in Fig. 4 is quite similar to that seen in Fig. 3, the lenses being arranged substantially the same, but in this instance I preferably employ a strip of sensitized film —40— which may be wound upon suitable rollers —41— and —42— within an inclosing case —43—. In this device one portion, as —44— of the film strip is disposed at substantially right angles to the focal axis of one of the lenses, as —45—, and upon which one of the pictures is taken while another part of the film, as 47—, is disposed at an angle with the optical axis of its lens, as 48, and the rays of light passing through the latter lens are reflected by a mirror —49— onto the sensitized portion —47— of the strip of film, the mirror being located in such manner as to produce upon the part —47— a picture of the same object, but in reverse order from that produced upon the part —44—.

I have now described four different forms of binocular cameras for producing reverse pictures, which is the broad object of my invention, and while neither of these cameras are shown in very much detail, the salient feature of combining the reflector with the lens and sensitized plate of one side of the camera is believed to be clearly brought out. In fact—it is quite sufficient to state that the invention consists essentially in providing two cameras, one of which is equipped with a reflector so disposed as to reflect the rays of light upon one plate in a reverse order from those reflected upon the other plate.

Having thus described my invention what I claim and desire to secure by Letters Patent is:

1. In a photographic apparatus containing, two sensitized surfaces, separate devices for converging the rays of light from the object onto each surface in the same exposure, one device being movable with reference to the other device to vary the distance between the axes of the pencils of light from the object in combination with means to reverse and project the rays of light onto one of said surfaces.

2. A binocular camera having one of its lenses adjustable to vary the distance between the axes of the pencils of light from the object in combination with means to reverse and project the rays of light passing through one of the lenses.

3. A binocular camera having the optical axes of the lenses disposed at an angle with each other, and means to adjust the distance between the lenses and their sensitized surfaces simultaneously in combination with means to reverse and project the rays of light passing through one of the lenses.

In witness whereof I have hereunto set my hand this 27th day of April 1904.

WILLIAM VERBECK.

Witnesses:
   H. E. CHASE,
   MILDRED M. NOTT.